(12) United States Patent
Harestad et al.

(10) Patent No.: US 9,580,991 B2
(45) Date of Patent: Feb. 28, 2017

(54) SHEAR VALVE

(75) Inventors: Kristian Harestad, Randaberg (NO);
Helge Skorve, Stavanger (NO);
Magnar Tveiten, Sandnes (NO)

(73) Assignee: PETROLEUM TECHNOLOGY COMPANY AS, Stavanger (NO)

( * ) Notice: Subject to any disclaimer, the term of this patent is extended or adjusted under 35 U.S.C. 154(b) by 342 days.

(21) Appl. No.: 14/116,134

(22) PCT Filed: Mar. 15, 2012

(86) PCT No.: PCT/EP2012/054554
§ 371 (c)(1),
(2), (4) Date: Jan. 22, 2014

(87) PCT Pub. No.: WO2012/156117
PCT Pub. Date: Nov. 22, 2012

(65) Prior Publication Data
US 2014/0130893 A1 May 15, 2014

(30) Foreign Application Priority Data

May 16, 2011 (NO) .................................. 20110723

(51) Int. Cl.
*E21B 34/06* (2006.01)
*E21B 34/10* (2006.01)
*F16K 3/02* (2006.01)

(52) U.S. Cl.
CPC ............ *E21B 34/06* (2013.01); *E21B 34/063* (2013.01); *E21B 34/102* (2013.01); *F16K 3/0281* (2013.01); *Y10T 137/1632* (2015.04)

(58) Field of Classification Search
None
See application file for complete search history.

(56) References Cited

U.S. PATENT DOCUMENTS

| 2,760,408 A | 8/1956 | Taylor |
| 4,655,286 A | 4/1987 | Wood |
| 4,901,798 A * | 2/1990 | Amani .................... E21B 34/10 166/311 |
| 5,092,406 A * | 3/1992 | McStravick ............ E21B 21/10 166/321 |
| 2004/0094304 A1* | 5/2004 | Turner .................. E21B 34/102 166/313 |
| 2007/0034377 A1* | 2/2007 | Moyes .................. E21B 34/063 166/305.1 |

FOREIGN PATENT DOCUMENTS

| EP | 0229706 Y | 7/1987 |
| GB | 2334276 | 8/1999 |
| WO | WO2007/014009 | 2/2007 |
| WO | WO2009/038467 | 3/2009 |

* cited by examiner

*Primary Examiner* — Jennifer H Gay
*Assistant Examiner* — Caroline Butcher
(74) *Attorney, Agent, or Firm* — Birch, Stewart, Kolasch & Birch, LLP

(57) ABSTRACT

A shear valve (1) for use in a downhole tool between the annulus and tubing in a well comprises an outer housing (11) and an internal body (13) movable in a longitudinal direction within the housing when the valve is activated, and at least one obstruction device (16, 10) which can be arranged to obstruct the internal body from moving. The obstruction device is capable of being deactivated by pressure from the tubing side of the valve.

13 Claims, 3 Drawing Sheets

SHEAR VALVE

The invention relates to a shear valve for use in a downhole tool.

In order to exploit natural reservoirs of hydrocarbons, one or more bores are typically drilled in the ground from a position on the ground surface. Processing installations on or above the ground surface, which then in different ways are able to communicate with the reservoir, are further adapted to collect and treat the produced fluids.

Natural pressure in the reservoir acts to lift the produced fluids upward to the surface through a production tubing. The reservoir pressure must in this case exceed the hydrostatic pressure of the fluid in the well bore and back-pressure imposed by the production facilities at the surface for the well to produce naturally.

However, the natural pressure in a well will gradually decrease as the well is run, whereby this entail a smaller amount of produced fluids. This bring about a need to either increase the pressure in the fluid reservoir again, or in other ways to enhance the production of fluids. The basic idea for all such methods and or devices is to drive more hydrocarbons out of the reservoir.

When an external source of energy is employed in the well, for example a pump, the well is said to produce by means of an artificial lifting. The two most common used systems today are however water injection and gas injection. The gas injection method is also known as pneumatic lifting or pneumatic pumping.

In common configuration utilised in this gas injection method, natural gas under high pressure is injected into the annular space between the casing and the production tubing. The gas injection devices, for instance valves, control subsequently the flow of gas that discharges from the annular space to the interior of the production tubing.

Depending on the properties of the well, one or more of gas injection valves are positioned at different locations along the length of the production tubing. When the pressurised gas enters the production tubing, it will expand and the consequential reduction in the density of the production flow will permit an increased flow of fluids.

GB 2334276 A discloses a downhole tool which is positioned inside a wellbore, i.e. inside a tubing string, to remove hydraulic fracturing proppants from the tubing string when scree-out occurs. The tool comprises a body with a bore and a port for fluid communication between the bore and an annular passage formed between the body and the tubing string casing. The tool comprises a piston (80) for movement between an open position and a closed position to open and close the port, a rupture disc (66) which ruptures at a predetermined pressure of a fluid in the annular passage so that this pressure is communicated to the piston to move it from a closed to an open position, thus allowing the fluid to flow from the annular passage, through the port (74) and into the bore (60), thus flushing the proppants out of the tubing string. The tool also comprises a lock member (90) for permanently securing the piston in a closed position after it has moved from an open position.

WO2009/038467 describes a gas lift shear open valve where the intention is to shear open and subsequently function as a normal valve. In an embodiment the intention of the valve is to act as a barrier element between annulus and tubing (safe closed) and at a desired stage the valve is pressurized open with an injection fluid and the preset closing arrangement of the valve is pressurized open. After opening the intention of the valve is to keep open at all time.

A drawback of this valve is that it will shear when the well is pressure tested by pressurizing annulus. In a well with more than one shear valve activated with pressuring from annulus, it is then not possible to know if more than one valve has been sheared. The object of the invention is to provide a shear open valve which is sheared open from the tubing side and thus allows pressurizing from annulus without the valve opening, thus allowing more than one shear open system inside the well at the same time.

One embodiment of a shear valve according to the invention for use in a downhole tool between annulus and tubing comprises an outer housing and an internal body movable in a longitudinal direction within the housing when the valve is activated. The valve further comprises at least one obstruction device obstructing the internal body from moving, the obstruction device being deactivated by pressurizing the tubing side of the valve.

By deactivation in this description it is meant that the obstruction device is no more obstructing, the valve thus being activated as the internal body can move within the housing. By reactivation it is meant that the obstruction device is reset to its obstructing state.

The outer housing is hollow and comprises an internal spacing adapted for receiving the movement of the internal body. The internal body is in a closed position contacting/resting on a valve seat formed inside the outer housing, thus forming a seal. When opening, the internal body moves in the internal spacing away from the valve seat and to a position where the flow is allowed to pass through openings in the outer housing and out into the tubing.

The obstruction device is a device physically obstructing the movement of the internal body by being arranged in a location in the tubing end of the valve. The deactivation of the obstruction device may be performed by breaking the obstruction device or parts of the obstruction device. The obstruction device may be or comprise pins, cubes, cylinders and may be solid or hollow. The breaking of the obstruction device may be done by activating a detonation, by means of an object applying a force released by pressure onto the obstruction device, other types of trigger devices, etc. The obstruction device may be made of by ceramics or glass, metal or other breakable material. The chose of material and size/shape of the obstruction device may depend on the expected pressures and the forces to be applied.

In one embodiment the obstruction device can be designed to deactivate at a predetermined pressure difference between tubing and a secondary volume. The secondary volume may in one embodiment be annulus, or the secondary volume may be another volume, for example a vacuum chamber. The vacuum chamber or other volume may be arranged in the internal space of the outer housing or other suitable place.

In one embodiment the obstruction device may be reactivated, ie. the obstruction device is brought back to its obstruction position. This may be embodied for example by means of reactivation means which may comprise a ratchet device. In one embodiment the ratchet device may comprise a number of steps which are activated by means of a pressure pulse or by exceeding a pressure threshold. For each step, the obstruction device may change position, or the obstruction device may change position after a certain number of steps, the new position not being obstruction the movement of the internal body. After having stepped up a defined number of steps, the obstruction device will again assume its obstruction position. Other types of reactivation means may also be used. The reactivation means may be arranged in the nose section of the valve.

In one embodiment the reactivation means comprises a timer. The timer will determine the time interval between deactivation and reactivation of the obstruction device. The timer may be hydraulic, mechanical, electronic, chemical or other suitable means for providing a defined time interval between events, for example by delaying the movement back to closed position by means of friction, a chemical compound having a specific decomposition time or dissolving time, etc.

In one embodiment the shear valve comprises a second obstruction device. The second obstruction device can for example be deactivated by pressurizing the annulus side of the valve as in prior art shear valves, for example of the type described in WO2009/038467.

The invention will now be described in more detail by means of an example and with reference to the attached figures.

In the figures are shown different embodiments of a gas lift valve, where the valve is to be positioned in a well stream. A skilled person will understand how this is done and this is therefore not described in this description.

Figure 1A:
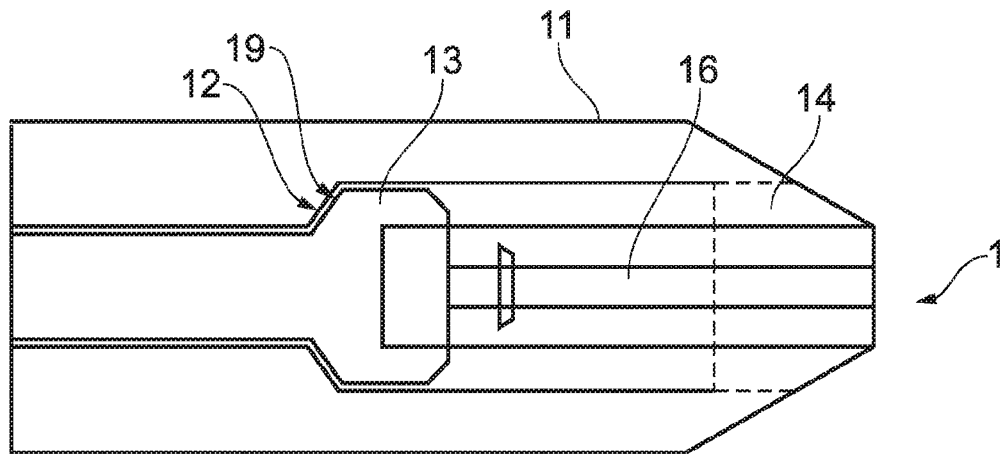
FIGS. 1a and 1b show a prior art gas lift valve.

Referring now to FIG. 1a, the main parts of a prior art gas lift valve with shear activation is shown. The gas lift valve 1 comprises an outer hollow housing 11, in which hollow housing 11 is arranged an internal movable body 13. The outer hollow housing 11 in this embodiment comprises two parts, that is, the main part 11 and a pre tensioning section 14. The device in the figure is shown in a closed position and the internal movable body 13 is therefore abutting against a valve seat 12 in the outer hollow housing 11. A retainer key 16 is arranged between the pre tensioning section 14 and the internal movable body 13, pressing the internal movable body 13 against the valve seat 12, thereby forming a metal to metal seal system at the interface between the outer hollow housing 11 and the internal movable body 13.

This is because the internal movable body 13 comprises a valve element sealing surface 19. Although the shown device is used as a gas lift valve, it is obvious that the principle of it may be used for other kind of injection valves.

Figure 1B:
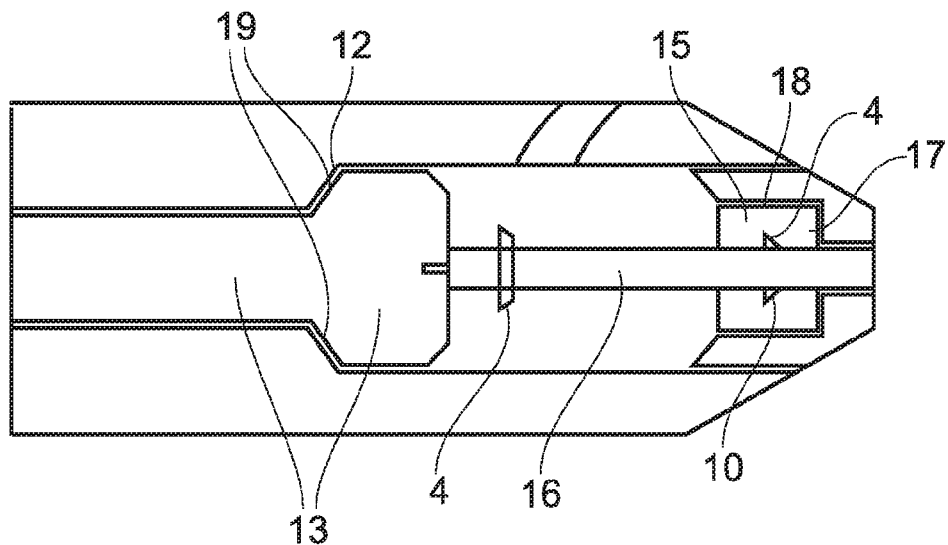

In the pre tensioning section 14 in FIG. 1a is (illustrated in FIG. 1b) a screw nut or a counter screw nut 15, which also have a through going bore 17, is screw in into engagement with a partial recess 18. The screw nut or counter screw nut 15 has on the inside of the bore 17 arranged locking means 10 for locking the retainer key 16 temporary to the outer housing 11. The locking means 10 may in the screw nut or counter screw nut 15 be a graduation 4, in which graduation the first set of corresponding locking means 10 on the retainer key 16 are received. This position will correspond to the valve being in a closed position. However, when the valve is exposed for a pressure (from the annulus) that exceeds the predetermined pressure for the valve, the locking means 10 on the retainer key 16 being in the graduation 4 will break and thereby allowing the internal movable body 13 and the retainer key 16 to move towards the pre tensioning section 14 and away from the valve seat 12.

Figure 2A:
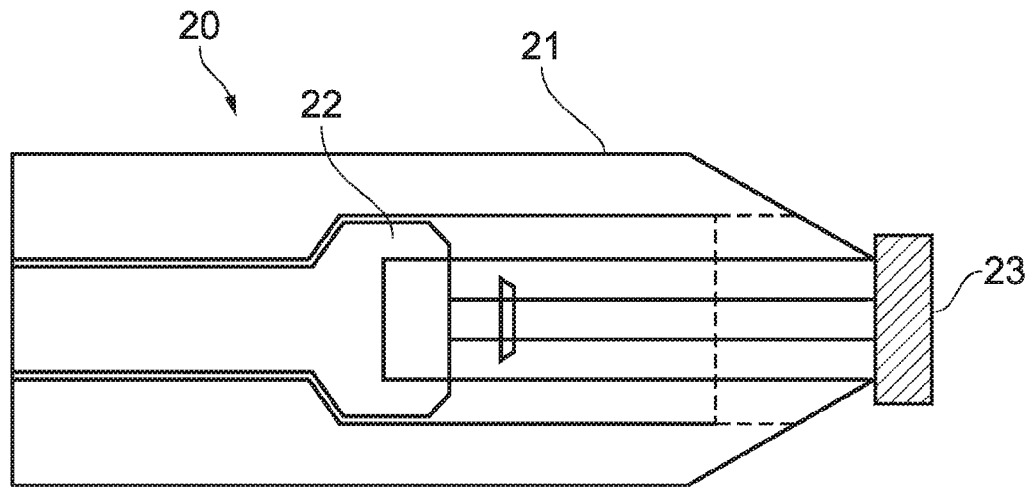
FIG. 2 shows an embodiment of a valve according to the invention.
Figure 2B:
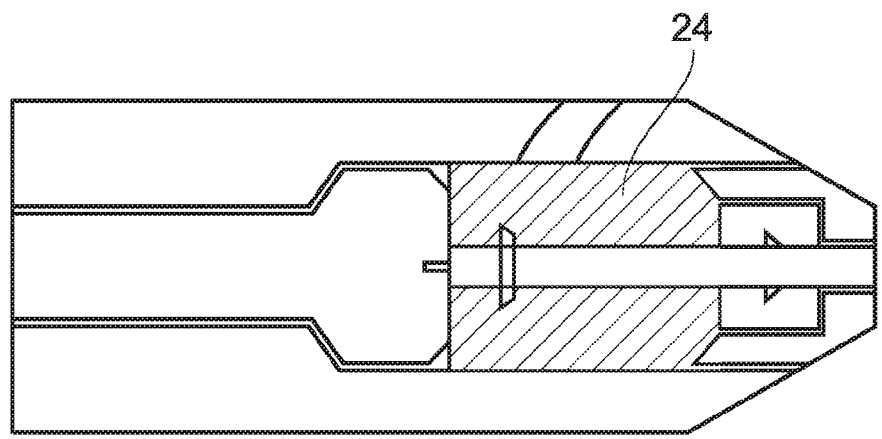

FIGS. 2a and 2b show a shear valve 20 according to the invention for use in a downhole tool between annulus and tubing. The valve comprises an outer housing 21 and an internal body 22 movable in a longitudinal direction within the housing when the valve is activated. The valve further comprises an obstruction device 23, in this embodiment arranged on the outside of the outer housing 21, obstructing the internal body from moving. The obstruction device 23 may for example be a breakable sealing which breaks, thus being deactivated, when the pressure difference between the tubing and annulus exceeds a threshold thus making the internal body 22 free to move. In another embodiment, a chemical compound may be released when exposed to the pressure, thus weakening the obstruction device 23 until it is deactivated. In FIG. 2b, the obstruction device 24 is arranged in the hollow part of the outer housing and may be a massive material which is crushed when exposed to a certain pressure.

Figure 3:
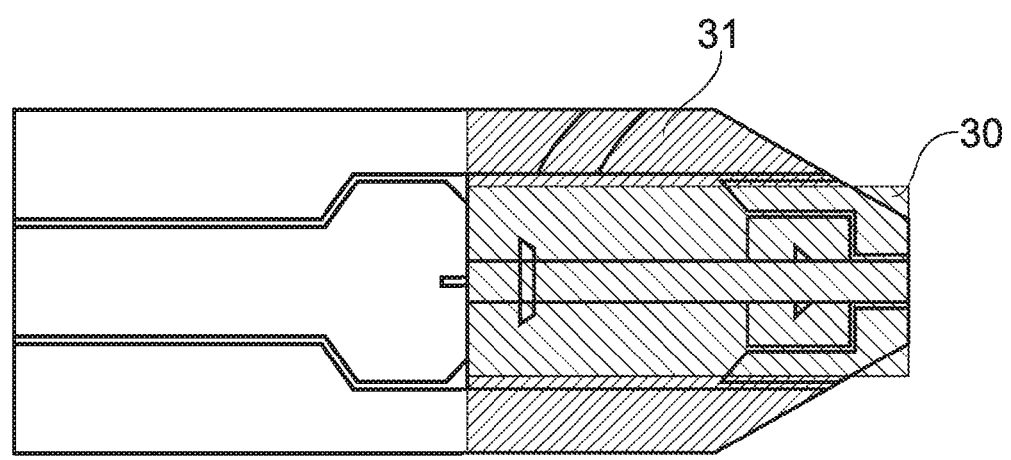
FIG. 3 illustrates an embodiment of the invention.

In FIG. 3 it is indicated the possible area of location of the obstruction device. The area of the obstruction device may depend on the type of obstruction device, but will in most instances be in the first shaded area 30, and in some cases in the second shaded area 31.

The invention claimed is:

1. A shear valve for use in a downhole tool between an annulus and tubing in a well for injecting an injection fluid into the tubing, comprising:
    an outer housing and an internal body which is movable in a longitudinal direction within the housing between a closed position and an open position when the valve is activated, whereby when in said closed position the internal body rests on a valve seat inside the housing such that a seal is formed,
    a locking device arranged to deactivate at a predetermined locking device deactivation pressure, whereby when said locking device deactivation pressure is reached from an annulus side of the valve the locking device will deactivate, thereby allowing the internal body to move to an open position whereby the internal body is positioned away from the valve seat such that the injection fluid is allowed to flow into the tubing, and
    an obstruction device which, when active, is arranged to obstruct the internal body from moving within the housing, thus allowing pressurizing from the annulus side of the valve without the valve opening, which obstruction device is capable of being deactivated by pressurizing from a tubing side of the valve such that the obstruction device, when in a deactivated state, is arranged to allow the internal body to move within the housing.

2. Shear valve according to claim 1, wherein the obstruction device is designed to deactivate at a predetermined pressure difference between the tubing side of the valve and a secondary volume.

3. Shear valve according to claim 2, wherein the obstruction device is a breakable sealing device which breaks at a pressure difference between tubing and the secondary volume.

4. Shear valve according to claim 2 or 3, wherein the secondary volume is the annulus.

5. Shear valve according to claim 2 or 3, wherein the secondary volume is a vacuum chamber.

6. Shear valve according to claim 3, wherein the breakable sealing device is made of ceramics or glass, metal or other suitable material.

7. Shear valve according to claim 1, wherein the valve further comprising a trigger device for causing deactivation of the obstruction device.

8. Shear valve according to any one of claim 1 or 7, wherein the valve further comprising activating means to reactivate the obstruction device, the activating means being arranged on the tubing side of the valve.

9. Shear valve according to claim 1, wherein the obstruction device includes reactivation means.

10. Shear valve according to claim 8, wherein the reactivation means comprises a ratchet device.

11. Shear valve according to claim 8, wherein the reactivation means comprises a timer.

12. Shear valve according to claim 1, wherein the valve comprises a second obstruction device, the second obstruction device being deactivated by pressurizing the annulus side of the valve.

13. Shear valve according to claim 1, wherein the valve, when in said closed position, is arranged to act as a barrier element between the annulus and the tubing.

* * * * *